April 21, 1964     H. M. STOLLER     3,130,337
DYNAMO-ELECTRIC MACHINE CONSTRUCTION
Filed Aug. 4, 1950
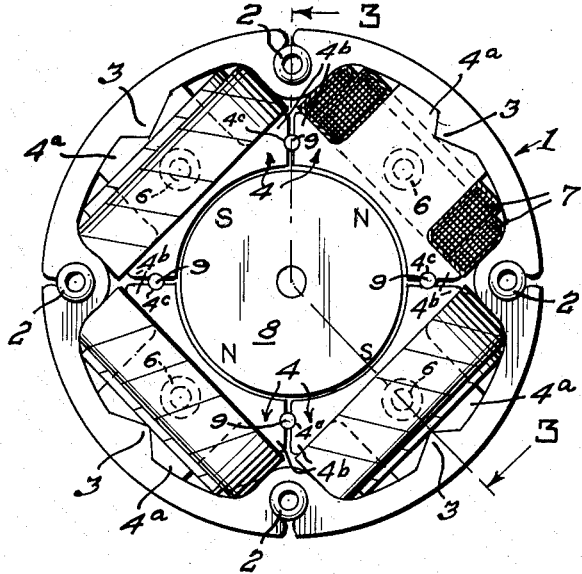
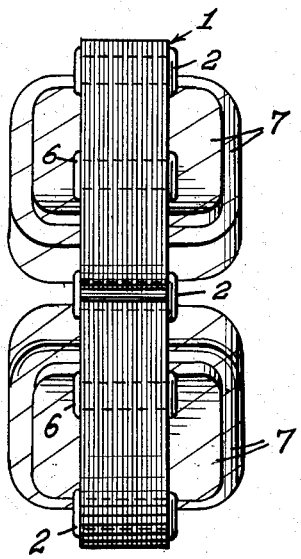
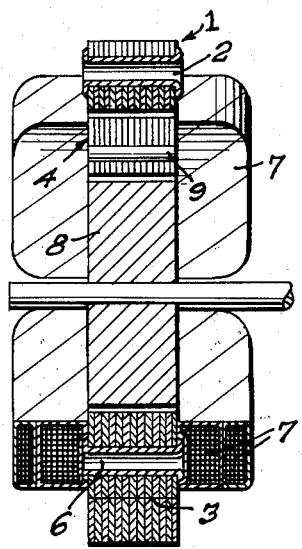
Inventor,
Hugh M. Stoller, deceased
By Marion M. Stoller, executrix
By
G. J. Kessenich, J. H. Church + M. L. Libman
Attorneys United States Patent Office 3,130,337
Patented Apr. 21, 1964

3,130,337
DYNAMO-ELECTRIC MACHINE CONSTRUCTION
Hugh M. Stoller, deceased, late of Mountain Lakes, N.J., by Marian M. Stoller, executrix, Mountain Lakes, N.J., assignor, by mesne assignments, to the United States of America as represented by the Secretary of the Army
Filed Aug. 4, 1950, Ser. No. 177,656
2 Claims. (Cl. 310—258)

This invention relates to dynamo-electric machines such as electric motors and generators having magnetic pole pieces and has for its primary object a simple and inexpensive construction for such machines.

With the above object in view, the present invention provides for separable stator pole pieces which can be prewound and assembled in a ring frame. The stator pole pieces are provided with lateral extensions on the ends adjacent the rotor, so shaped and dimensioned that when the plurality of pole pieces are assembled, the extensions on adjacent pole pieces nearly touch and the pole pieces are held in place by dowel pins inserted between adjacent extensions.

The specific nature of the invention as well as other objects and advantages thereof will clearly appear from a description of a preferred embodiment as shown in the accompanying drawings, in which, FIG. 1 is a schematic end view of a four-pole generator, completely assembled, FIG. 2 is a side view of the structure shown in FIG. 1, and FIG. 3 is a sectional view taken on line 3—3 of FIG. 1.

Referring to FIG. 1, the outer yoke or ring 1 of the stator may be of the usual laminated construction, the laminae being assembled by superpositioning them and fastening them together by any suitable means such as four eyelets 2, thus providing apertures for long bolts whereby the stator may be fastened to any suitable frame, in accordance with conventional practice.

The ring or yoke 1 is provided with four irregular projections of bosses 3, whereby poles 4, hereinafter described, may be accurately and uniquely positioned.

The pole pieces 4 are preferably also of laminated construction, the laminations being stacked and fastened together by eyelets 6 or by any other suitable fastening means. The prewound coils 7 (shown as a double winding for high and low voltages) may be put on the pole pieces prior to their assembly in the stator, as they will slip over the narrow ends 4a of the pole pieces. The other end of each pole piece has integral pole shoes formed to include lateral extensions 4b cut at an angle of 45° to the pole axis (in the case of a four-pole stator) so that the adjacent edges of these extensions will very nearly abut as shown. A substantially semicircular nick 4c is cut in each lamination, so that a circular hole will be formed when adjacent pole pieces are assembled. The inner or free end of each pole shoe is suitably curved to a circular arc which will provide proper clearance for the rotatable field member 8, which has a smooth cylindrical surface and is spot magnetized to form a suitable number of magnetic poles, after the fashion described in U.S. patent to Kalin, No. 2,071,536. When the coils 7 are suitably connected, rotation of field member 8 by a suitable external source of mechanical power will produce a voltage in the stator winding.

After the individual pole pieces 4 are assembled as shown, suitably sized pins 9 are driven into the holes at 4c to rigidly hold the assembly together. The pins are preferably made of poor-conducting material so as not to short-circuit the laminations and thus reduce their effectiveness in minimizing eddy currents.

The above described form of assembly has been found particularly advantageous in the construction of small, high speed generators where the parts are small enough for manual assembly, but it will be apparent that this construction will also be useful for medium-sized machines, both generators and motors.

It will be apparent that only one pin need actually be driven in, so that the other pins may be preattached (as by welding), each to one pole piece, whereby assembly is facilitated; or three of the pins shown may be entirely omitted and only one pin used. However, the magnetic field distribution called for usually requires a minimum magnetic gap between adjacent pole shoes so that some form of spacer is usually desirable in any case.

It will be apparent that the embodiments shown are only exemplary and that various modifications can be made in construction and arrangement within the scope of my invention as defined in the appended claims.

It is claimed:

1. A stator assembly for dynamo-electric machines comprising a hollow laminated yoke member, separable laminated pole pieces adapted to be removed as a unit from said yoke member extending inwardly from said yoke member toward a common center, the free ends of said pole pieces being equidistantly spaced from said common center to provide space for a rotor, circumferentially extending pole shoes on said pole pieces, and windings on said respective pole pieces between said pole shoes and said yoke member, each of said pole shoes extending toward and close to an adjacent pole shoe, an interfitting projection and depression on the yoke member and on the adjacent end of each of said pole pieces, respectively, and wedge means between two adjacent pole shoes for holding said assembly firmly in place, so that each pole piece is accurately positioned and held against movement on said yoke member.

2. The invention according to claim 1, wherein contiguous edges of adjacent pole pieces are grooved to form axially directed channels, and said wedge means is in the form of a pin forced into one of said channels.

References Cited in the file of this patent
UNITED STATES PATENTS

| | | |
|---|---|---|
| 1,115,947 | Lincoln | Nov. 3, 1914 |
| 2,535,004 | Willits | Dec. 19, 1950 |